Inventors:
Pierre Duchemin
Jean-Claude Etienne
By
Karl W. Flocks

Nov. 10, 1970 P. DUCHEMIN ET AL 3,540,013

MECHANICAL MEMORY DEVICE, MAGNETICALLY ACTUATED

Filed Nov. 27, 1968 3 Sheets-Sheet 2

MECHANICAL MEMORY DEVICE, MAGNETICALLY ACTUATED

Filed Nov. 27, 1968 3 Sheets-Sheet 3

United States Patent Office 3,540,013

Patented Nov. 10, 1970

3,540,013

MECHANICAL MEMORY DEVICE, MAGNETICALLY ACTUATED

Pierre Duchemin, Le Vesinet, and Jean-Claude Etienne, Le Chesnay, France, assignors to La Telemecanique Electrique, Nanterre, Hauts-de-Seine, France, a joint-stock company of France Filed Nov. 27, 1968, Ser. No. 779,471
Claims priority, application France, Dec. 1, 1967, 130,719
U.S. Cl. G11c *23/00*
U.S. Cl. 340—173 7 Claims

ABSTRACT OF THE DISCLOSURE

The invention relates to improvements to numerical read-out systems for moving bodies which fundamentally utilize a movable mass rolling in a block provided with a conduit, said mass resting alternately through gravity in two cavities of the conduit which has the shape of an inverted V with two downwardly directed branches. According to the invention, the branches are curved and correspond to the course of the movable mass which has the shape of a thin-walled cylinder. The curved branches permit, under the influence of a magnetic field, the resultant of which corresponds to the direction of one branch of the V inclined with regard to a horizontal line, the said course to be approximately an arc of parabola above the ridge separating the curved branches.

The present invention relates to improvements to numerical read-out systems for moving bodies, having a group of mechanical memory devices placed side by side, a reading station and a recording station. Blocks constitute said memory devices and a conduit is hollowed inside each block. The said conduit has the shape of an inverted V with two downwardly directed branches, an apex and a ridge between said branches, one of said branches being inclined with respect to a horizontal line. A movable mass is capable of being transferred from one branch to the other and the immobilization of said mass in one or the other branch corresponds to a stable position to which is attributed a binary numerical signification.

An object of the invention is to bring important improvements in the rapidity of response and the safety of use of such systems.

It has for an object more particularly to eliminate any read-out error which would ensue either from rebounds of the movable mass rolling in its conduit, or sudden accelerations or shocks which might affect the read-out bodies which can be carrying vehicles.

According to the invention, the branches of the inverted V-shaped conduit are curved and correspond to the course of a movable mass in the shape of a thin-walled cylinder, the said curved branches permitting, under the influence of a magnetic field the resultant of which corresponds to the direction of one branch of the V inclined with regard to a horizontal line, the said course to be approximately an arc of parabola above the ridge separating the curved branches.

Preferably the apex of the inverted V joining the two curves forming the branches is a round having a radius corresponding to the radius of the movable cylinder, said round cutting said inclined branch, so as to form a retaining abutment impeding any coming back of the cylinder by a rebound towards the inclined branch.

According to another improvement, the ridge of the conduit separating the two branches is constituted by a massive body of metal or other non magnetizable plastic material and constrained to move, under the effect of its inertia, only towards the apex of the V conduit, so as to close the conduit and thus prevent any change of position of the magnetizable cylinder.

According to a still further improvement connected with the preceding ones, the ends of the inverted V branches are in the shape of pockets in which the cylinder can rest and they are provided with a small quantity of damping liquid, the two pockets being connected by a small duct of equilibrium.

Two embodiments of the object of the invention will be described by way of example with reference to the accompanying drawings in which.

Figure 7:
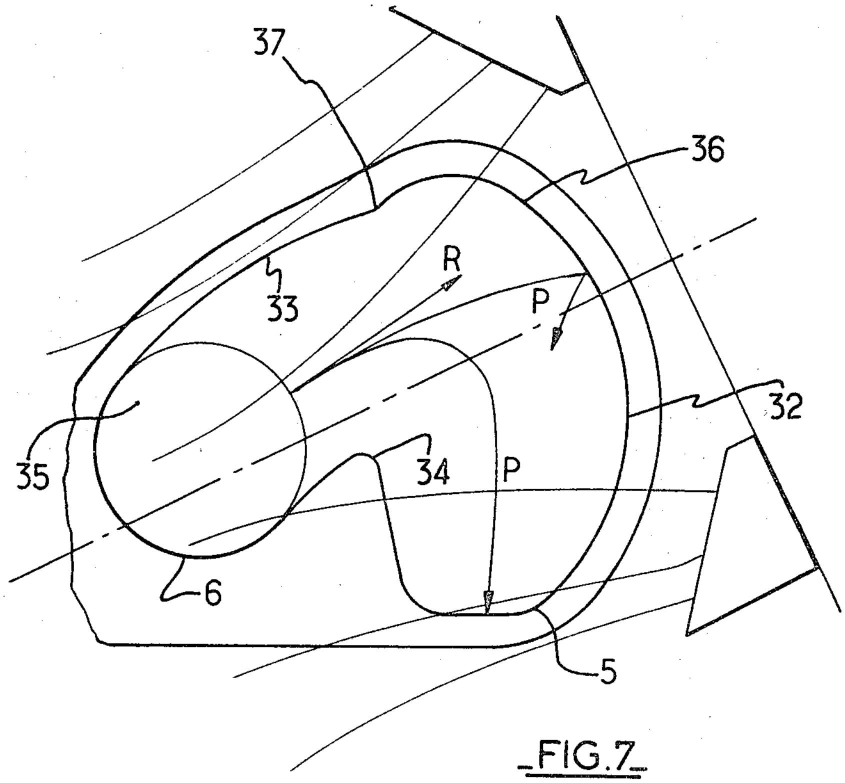
FIG. 7 is an explanatory diagram of operation.
Figure 1:
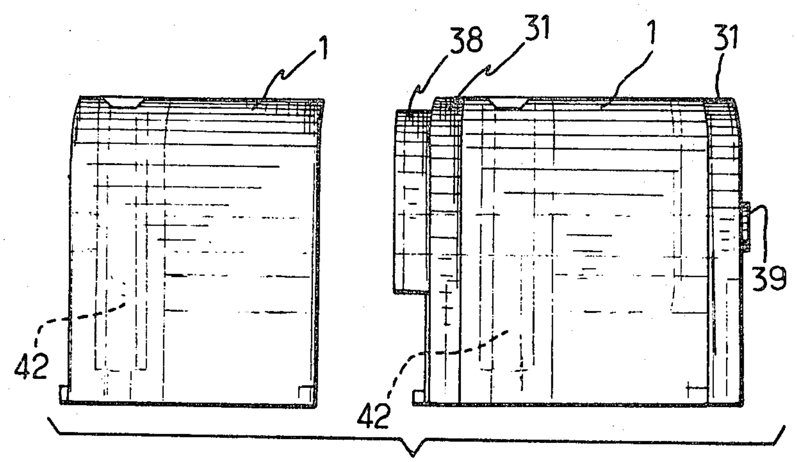
FIG. 1 shows in elevation two blocks slightly spaced one from the other, one of said blocks being provided with two intermediate covers.

The read-out system for moving bodies according to the invention comprises a series of blocks 1 in line and connected two by two by intermediate covers 31.

Each of said blocks is made of a transparent moulded material (preferably of the plastic material known under the name of "Makrolon") and is hollowed by a conduit or a recessed hole the straight section of which has the shape of an inverted V, laid on the side.

The conduit thus has two branches or inclines 32 and 33 downwardly inclined. Branch 33 is longer than branch 32 starting from a same origin which is the apex of the V. Each branch ends in a pocket 5 and 6 and a round ridge 34 separates the two pockets.

The branches 32 and 33 are incurved so as to correspond to the course of the movable body 35 enclosed in the conduit of the block. The body 35 is, preferably, constituted by a portion of a tube of soft steel with a very thin wall.

The apex of the V is a round 36 whose radius corresponds to the radius of the cylinder 35.

The round 36 cuts the longest wall of the branch 33 so as to form a retaining abutment 37 impeding any coming back of the cylinder 35 into the pocket 6, under the effect for example of sudden rebound.

Figure 3:
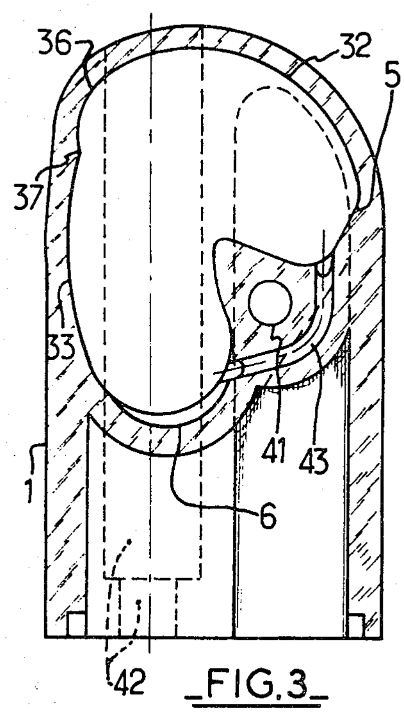
FIG. 3 is a view of one end of said block.

FIG. 3 shows, as a whole, a block 1 on the opening side of its recessed hole.

Figure 5:
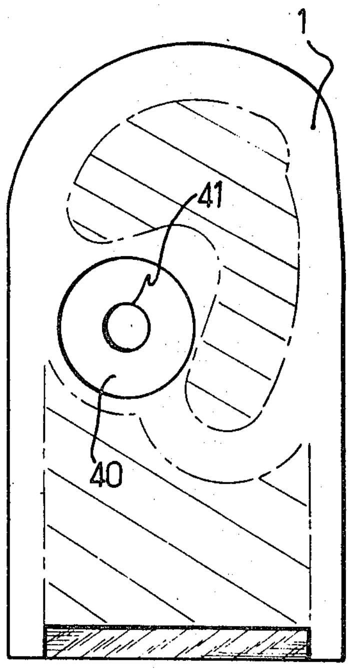
FIG. 5 is a view of the other end of the block.

FIG. 5 shows the block on the closed side.

Figure 6:
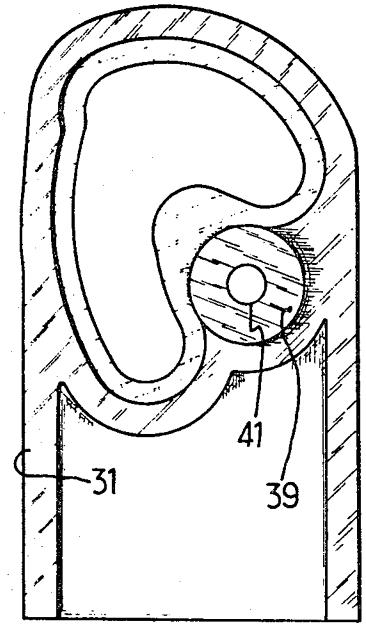
FIG. 6 is a corresponding view of the cover applied to said other end of the block.
Figure 4:
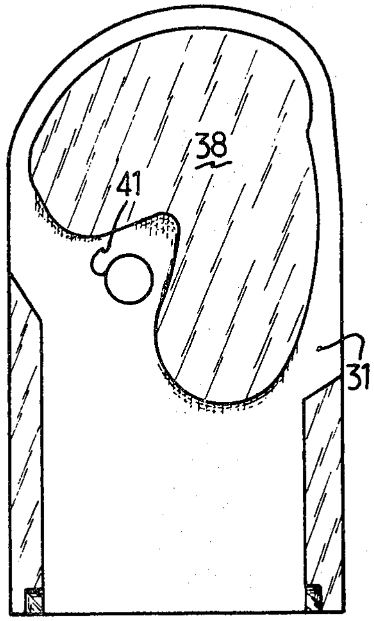
FIG. 4 is a corresponding view of the cover applied to said end of the block.

FIG. 4 and 6 show the double cover 31 according to the one or the other of its faces. The face which is associated with the open side of the block comprises a projection 38 which fits into the recessed hole. The face which is associated with the closed side of the block comprises a cylindrical stud 39 which penetrate into a corresponding cap 40 made in the closed site of the block.

The blocks and covers may be connected by a rod (not shown) which traverses them through holes 41 which are aligned upon assembly.

Figure 2:
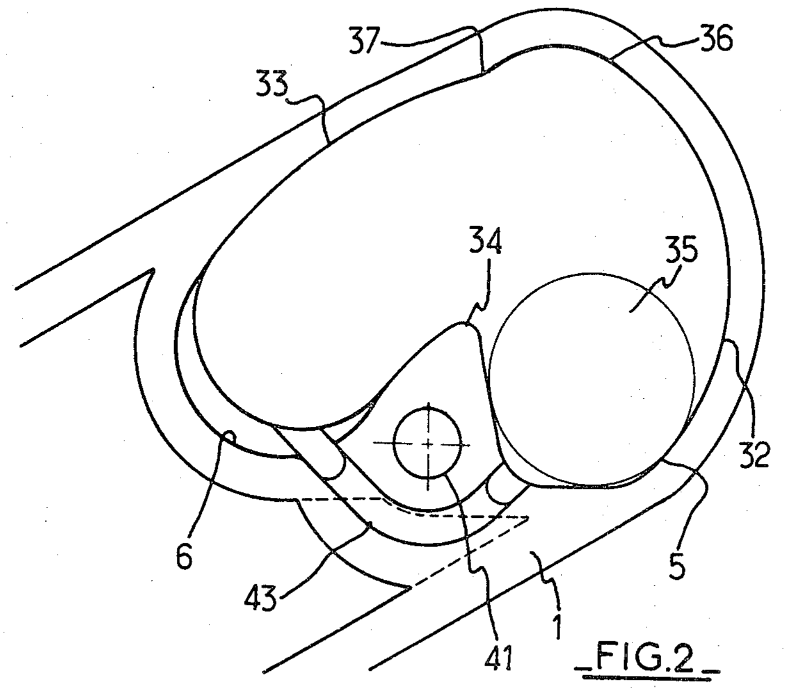
FIG. 2 is a partial section of the first embodiment of a block according to the invention.
Figure 8:
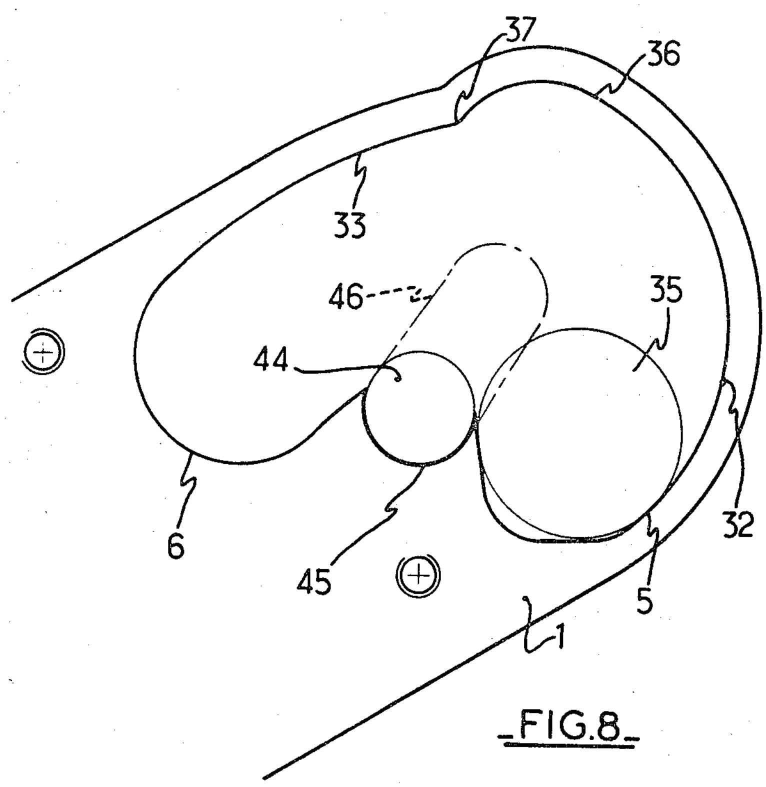
FIG. 8 is a partial section of the second embodiment of a block according to the invention.

The block and intermediate cover unit thus connected is fixed on the moving body to be read out, the axis being placed at an angle of 30° with a horizontal line (see FIGS. 2, 7 and 8). Screws passing through holes 42 serve for this attachment.

The pockets 5 and 6 may receive a certain quantity of a damping liquid and the two pockets are connected by a duct of equilibrium 43. This liquid is, preferably, a mixture of water and glycol.

According to the variant of FIG. 8, the ridge 34 separating the two branches of the inverted V is constituted by a massive cylindrical body 44 of a non magnetizable metal normally resting in a cradle or other material 45. It may move towards the apex of the V under the effect of its inertia so as to prevent any change of position of the magnetizable movable body 35. The massive body 44 is guided with clearance by its two ends in grooves 46 made in the bottom wall of the block 1 and in the cover closing said block. These grooves are inclined by about 60° with a horizontal line.

The relation between the diameters of the magnetizable cylindrical body 35 and the massive body 44 is given by the following formula:

$$d>D(\sqrt{2}-1)$$

in which:

$d$=the diameter of the massive body
D=the diameter of the magnetizable body.

The mass of the massive body is greater than the mass of the magnetizable body.

The read-out on a number of blocks corresponding to the invention is carried out due to the action of magnetic fields (the lines of force of one of said fields may be seen in FIG. 7) produced by as many electromagnets as there are read-out elements in the binary code. The resultant R of each field corresponds to the direction of the branch 33 of the V inclined following a tangent forming 30° with a horizontal line. The other branch forms a rest cavity having a vertical axis plane.

The moulded blocks are constructed so as to provide sufficient space between one two-branched conduit and its adjacent one so that no interference should be produced between the magnetic fields. Lightness of the magnetizable cylinders 35 is indispensable so that they may start moving very rapidly under the action of a short call from the electros. On the contrary, the massive bodies 44 subject only to outer accelerations must be relatively heavy relative to the hollow cylinders. The operation, that is to say the change of position of each rolling body 35 under the effect of the electro must be interpreted as the action of an initial force on a projectile. The cylindrical body being subjected to said initial force continues on its starting speed following an arc of parabola P more or less stretched. The opposite walls of the conduit are arcs of a circle which approximately follow the shape of the parabola in such a way that if the started body strikes this wall, it cannot return to its first position. If the trajectory is short and the body falls directly vertically in the bottom of the pocket 5, it may happen that it rebounds upwardly, but in such a case, the upper round 36 forming an abutment 37 stops.

During the movement of the conveyors the vehicles (small swings) may follow very inclined paths and undergo rapid accelerations downwardly. In this case, the massive body 44 intervenes which locks, for the hollow cylinder, the upper part of the conduit.

The massive body must not, of course, enter into action at the moment when the magnetic system produces the read-out.

It is for this reason that the massive body must be non magnetizable, for example of brass. The read-out stations must also be placed in conveyor zones not subjected to vibrations or shocks, for example, outside the loading points of the vehicles and, of course, outside the trajectories where the vehicles may undergo rapid acceleration.

We claim:

1. Numerical read-out system for a moving body, having a group of mechanical memory devices placed side by side, a reading station and a recording station, blocks constituting said memory devices, a conduit hollowed inside each block, the said conduit having the shape of an inverted V with two downwardly directed branches, an apex and a ridge between said branches, one of said branches being inclined with respect to a horizontal line, and a movable mass capable of being transferred from one branch to the other, the immobilization of said mass in one or the other branch corresponding to a stable position to which is attributed a binary numerical signification, means for providing a magnetic field having a resultant corresponding to the direction of said inclined branch, and said movable mass in the shape of a cylinder of a thin wall, said magnetic field imparting to said cylinder, above said ridge existing between said branches which are curved, a course corresponding substantially to an arc of parabola.

2. Numerical read-out system according to claim 1 in which said apex between said curved branches is a round having a radius corresponding to the radius of said movable cylinder, said round cutting said inclined curved branch so as to form a retaining abutment impeding any coming back of said movable cylinder when a rebound of same towards said inclined branch initiates.

3. Numerical read-out system according to claim 1 in which said ridge between said curved branches is a body made of a non magnetic material and which is constrained, under the effect of inertia, to move only towards said apex, so as to close said conduit and to prevent any change of position of said movable cylinder which is made of a magnetizable material.

4. Numerical read-out system according to claim 1 in which said inclined curved branch is inclined along a tangent forming 30° with a horizontal line, and the other branch constitutes a resting cavity.

5. Numerical read-out system according to claim 1 in which the ends of said curved branches are pockets in which can stay said movable cylinders, a small duct of equilibrium connecting said pockets and a certain quantity of a damping liquid being provided in said duct.

6. Numerical read-out system according to claim 1 in which intermediate covers join said blocks two by two.

7. Numerical read-out system according to claim 6 in which said blocks and covers are fixed on said moving body along 30° with a horizontal line.

References Cited

UNITED STATES PATENTS

| | | | |
|---|---|---|---|
| 3,363,837 | 1/1968 | Gassino. | |
| 3,460,115 | 8/1969 | Leone | 340—173 X |
| 3,461,435 | 8/1969 | Hoffman | 340—173 |

TERRELL W. FEARS, Primary Examiner
S. HECKER, Assistant Examiner

U.S. Cl. X.R.

74—568; 198—38; 235—61.6